United States Patent
Bezemer et al.

(10) Patent No.: US 10,155,910 B2
(45) Date of Patent: Dec. 18, 2018

(54) FISCHER-TROPSCH CATALYSTS

(71) Applicant: SHELL OIL COMPANY, Houston, TX (US)

(72) Inventors: Gerrit Leendert Bezemer, Amsterdam (NL); Peter Geerinck, Wondelgem (BE)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/490,927

(22) Filed: Apr. 19, 2017

(65) Prior Publication Data

US 2017/0218280 A1 Aug. 3, 2017

Related U.S. Application Data

(62) Division of application No. 13/291,755, filed on Nov. 8, 2011.

(30) Foreign Application Priority Data

Nov. 8, 2010 (EP) .................................. 10190385

(51) Int. Cl.
| | | |
|---|---|---|
| *B01J 21/08* | (2006.01) | |
| *B01J 21/12* | (2006.01) | |
| *C10G 2/00* | (2006.01) | |
| *B01J 23/75* | (2006.01) | |
| *B01J 35/10* | (2006.01) | |
| *B01J 37/02* | (2006.01) | |
| *B01J 37/10* | (2006.01) | |
| *B01J 21/04* | (2006.01) | |
| *B01J 21/06* | (2006.01) | |
| *B01J 37/18* | (2006.01) | |

(52) U.S. Cl.
CPC .............. *C10G 2/332* (2013.01); *B01J 21/04* (2013.01); *B01J 21/063* (2013.01); *B01J 21/066* (2013.01); *B01J 21/08* (2013.01); *B01J 23/75* (2013.01); *B01J 35/1014* (2013.01); *B01J 35/1019* (2013.01); *B01J 35/1042* (2013.01); *B01J 35/1047* (2013.01); *B01J 35/1061* (2013.01); *B01J 35/1066* (2013.01); *B01J 37/0207* (2013.01); *B01J 37/10* (2013.01); *B01J 37/0201* (2013.01); *B01J 37/18* (2013.01)

(58) Field of Classification Search
None
See application file for complete search history.

(56) References Cited

U.S. PATENT DOCUMENTS

| | | | |
|---|---|---|---|
| 4,698,449 A | 10/1987 | Imai et al. | |
| 4,874,733 A | 10/1989 | Miller et al. | |
| 5,217,938 A * | 6/1993 | Reinalda | B01J 21/066 502/325 |
| 6,239,322 B1 | 5/2001 | Didillon et al. | |
| 6,736,544 B1 * | 5/2004 | DeWald | F16C 19/56 29/898.09 |
| 7,351,679 B2 | 4/2008 | Eri et al. | |
| 7,582,583 B2 * | 9/2009 | Bosch | B01J 29/40 502/63 |
| 2004/0023797 A1 * | 2/2004 | Wang | B01J 23/40 502/325 |
| 2004/0132834 A1 * | 7/2004 | Ortego | B01J 21/005 518/718 |
| 2004/0138317 A1 * | 7/2004 | Xie | B01J 21/04 518/703 |
| 2004/0265587 A1 | 12/2004 | Koyanagi et al. | |
| 2005/0096215 A1 * | 5/2005 | Espinoza | B01J 23/10 502/302 |
| 2007/0105964 A1 * | 5/2007 | Martinis | B01J 21/08 518/726 |

FOREIGN PATENT DOCUMENTS

| | | |
|---|---|---|
| CN | 1041711 A | 5/1990 |
| CN | 1386821 A | 12/2002 |
| CN | 101190793 A | 6/2008 |
| DE | 4142902 A1 | 6/1993 |
| DE | 102004009803 A1 | 9/2005 |
| DE | 102006058624 A1 | 7/2007 |
| EP | 0067459 B2 | 10/1998 |
| WO | 2004043596 A2 | 5/2004 |
| WO | 2007084437 A2 | 7/2007 |
| WO | 2007145676 A1 | 12/2007 |

OTHER PUBLICATIONS

Borg, Catalysis Today, vol. 142 (2009); pp. 70-77.
Logdberg, J. Catalysis, vol. 274 (2010); pp. 84-98.
Khodakov, Journal of Catalysis, vol. 206 (2004); pp. 230-241.
Saib et al., "Silica-Supported Cobalt Fischer-Tropsch Catalysts: Effect of Pore Diameter of Support", Catalysis Today, vol. 71, No. 3-4, Jan. 1, 2002, pp. 395-402.
Ohmacht et al., "Hydrothermal Treatment of Silica Gel", Chromatographia, vol. 19, No. 1, Jan. 1, 1984, pp. 473-476.
Rane et al., "Effect of Alumina Phases on Hydrocarbon Selectivity in Fischer-Tropsch Synthesis", Applied Catalysis A: General 20101120 Elsevier NLD, vol. 388, No. 1-2, Aug. 26, 2010.
Ghampson et al., "Effects of Pore Diameter on Particle Size, Phase and Turnover Frequency in Mesoporous Silica Supported Cobalt Fischer-Tropsch Catalysts", Applied Catalysis A: General 20101120 Elsevier NLD, vol. 388, No. 1-2, Aug. 24, 2010, pp. 57-67.
Disclosed Anonymously, "Effect of Drying Method and Precipitation pH in ZrO2 Preparation on Its Structural Textural Properties", ip.com Journal, IP.com Inc., West Henrietta, NY, US, Oct. 11, 2004.

* cited by examiner

*Primary Examiner* — Patricia L. Hailey
*Assistant Examiner* — Colette B Nguyen

(57) ABSTRACT

The invention relates to the preparation of a Fischer-Tropsch catalyst support and of a Fischer-Tropsch catalyst. A silica comprising support is subjected to hydrothermal treatment. The hydrothermal treatment results in catalysts having improved $C_5+$ selectivity as compared with catalysts prepared with a non-treated silica comprising support.

8 Claims, No Drawings

FISCHER-TROPSCH CATALYSTS

The present application is a divisional of U.S. patent application Ser. No. 13/291,755, filed Nov. 9, 2011 claims the benefit of European Application No. 10190385.4 filed Nov. 8, 2010, which is incorporated herein by reference.

FIELD OF THE INVENTION

The present invention relates to a process for preparing a silica-comprising catalyst support, a process for preparing a catalyst, a catalyst, and to the use of said catalyst in a Fischer-Tropsch process.

BACKGROUND OF THE INVENTION

The Fischer-Tropsch process is a well-documented process used for the conversion of synthesis gas (from hydrocarbonaceous feedstocks) into liquid and/or solid hydrocarbons. Generally, the feedstock (e.g. natural gas, associated gas and/or coal bed methane, heavy and/or residual oil fractions, coal, biomass) is converted in a first step into a mixture of hydrogen and carbon monoxide, often referred to as synthesis gas or syngas. The synthesis gas is then fed into one or more reactors where it is converted in one or more steps over a suitable catalyst at elevated temperature and pressure into mainly paraffinic compounds ranging from methane to high molecular weight modules comprising up to 200 carbon atoms, though even higher paraffins can be produced under certain conditions.

In the Fischer-Tropsch process, it is desirable to maximise the amount of $C_5+$ hydrocarbons produced and minimise production of methane. $C_5+$ selectivity can be influenced by a number of factors, including the choice of catalyst.

Typically, Fischer-Tropsch catalysts are based upon the transition metals, particularly cobalt, iron and ruthenium, of which cobalt-based catalysts are known to be highly active and are especially favoured when the feedstock is natural gas. Cobalt-based Fischer-Tropsch catalysts are also favoured for use in low temperature processes.

Most commonly, cobalt is dispersed on a solid porous support material. A solid porous support material may also be referred to as carrier. The carrier may, for example, be a refractory metal oxide support, such as alumina, silica, titania and, to a lesser extent, zirconia. By application of cobalt, or a cobalt comprising compound, on a carrier a catalyst is obtained. One method of applying cobalt, or a cobalt comprising compound, is by means of impregnation.

Various methods of impregnating a solid porous support material with a metal are known; melt impregnation and incipient wetness impregnation being two such examples.

Before use in a Fischer-Tropsch process, activation of the catalyst is generally required, which activation may involve one or more steps. Activation generally includes a reduction step in which a stream of hydrogen gas is passed over the catalyst at elevated temperature.

There is a need for new and improved silica-comprising Fischer-Tropsch catalysts and for processes for preparing such catalysts. Especially silica comprising catalysts with a decreased methane selectivity and an enhanced $C_5+$ selectivity in Fischer-Tropsch processes are desired.

SUMMARY OF THE INVENTION

The present invention resides in a process for preparing a Fischer-Tropsch catalyst support comprising at least the following steps:

providing a catalyst support material comprising silica and optionally up to 20 wt % of another refractory oxide, calculated on the total weight of refractory oxide in the catalyst support material, said other refractory oxide preferably being titania, alumina, or zirconia;

subjecting the catalyst support material to hydrothermal treatment;

in which process the catalyst support material is shaped before or after the hydrothermal treatment.

The present invention further resides in a process for preparing a Fischer-Tropsch catalyst comprising at least the following steps:

providing a catalyst support material comprising silica and optionally up to 20 wt % of another refractory oxide, calculated on the total weight of refractory oxide in the catalyst support material, said other refractory oxide preferably being titania, alumina, or zirconia;

subjecting the catalyst support material to hydrothermal treatment;

impregnating the treated catalyst support material with a catalytically active metal;

in which process the catalyst support material is shaped before or after the hydrothermal treatment, and in which process the catalyst support material is shaped before the impregnation with a catalytically active metal, and in which process the obtained catalyst is optionally subjected to hydrogen or a hydrogen-containing gas.

DETAILED DESCRIPTION OF THE INVENTION

A catalyst particle is defined for this specification as a particle that either is catalytically active, or that can be made catalytically active by subjecting it to hydrogen or a hydrogen containing gas.

For example, metallic cobalt is catalytically active in a Fischer-Tropsch reaction. In case the catalyst particle comprises a cobalt compound, the cobalt compound can be converted to metallic cobalt by subjecting it to hydrogen or a hydrogen containing gas. Subjection to hydrogen or a hydrogen containing gas is sometimes referred to as reduction or activation.

When a catalyst particle is referred to as comprising a certain weight of catalytically active metal, reference is made to the weight of metal atoms in the particle which are catalytically active when in metallic form. A catalyst particle comprising a cobalt compound, for example, is thus considered as a catalyst particle having a certain weight of catalytically active cobalt atoms. A catalyst particle thus comprises a certain weight of catalytically active metal, regardless of its oxidation state.

The catalyst support material comprises silica and optionally up to 20 wt % of one or more other refractory oxides, calculated on the total weight of refractory oxide in the catalyst support material. Silica is a refractory oxide. Said one or more other refractory oxides preferably is/are titania, alumina, and/or zirconia. The catalyst support material may also be referred to as carrier or carrier material.

The catalyst support material preferably comprises more than 50 wt % silica, more preferably more than 60 wt % silica, even more preferably more than 70 wt % silica, calculated on the total weight of the catalyst support material. The catalyst support material most preferably comprises 80 to 100 wt % silica, calculated on the total weight of the catalyst support material.

Besides the silica and the optionally other refractory oxide(s) the catalyst support material may comprise other components. An example of another component which may be present in the catalyst support material is a promoter. An example of a suitable promoter is manganese.

The silica used in the present invention preferably is hydrophilic fumed silica. An example of a hydrophilic fumed silica is Aerosil® 380 produced by Evonik Degussa GmbH supplied with a surface area (BET) in the region of 350-410 $m^2/g$.

If alumina is present in the catalyst support material, it preferably is a high purity alumina, such as Boehmite alumina. For example, the Pural® Boehmite aluminas produced by Sasol, particularly Pural® SB1 supplied with a pore volume in the region of 0.5 ml/g and a surface area (BET) in the region of 250 $m^2/g$, are preferred.

In the processes according to the present invention the catalyst support material is shaped, or formed, before or after the hydrothermal treatment. The catalyst support material used in the process of the invention may be shaped, for example, by coating on a support structure, spray drying, granulation, sol-gel processing, pelletizing or extrusion. Preferably, the catalyst support material may be shaped into an elongated shaped particle, such as a pellet, rod and cylinder, or into a polylobal-shaped particle, such as a trilobe or quadrulobe particle.

It was found that by subjecting a silica-comprising catalyst support material to a hydrothermal treatment, the structure of the support material may be changed. In particular, the pore structure of the support material may be altered. For example, the pore structure may be altered such that the surface area of the formed support material is reduced, the median pore diameter is increased, while the total pore volume of the support remains about the same.

The hydrothermal treatment may be performed on the support material prior to shaping it, for example by hydrothermal treating a support material powder and afterwards shaping it into a shaped catalyst support. More preferably, the hydrothermal treatment is performed after the support material has been shaped.

After hydrothermal treatment and shaping, or after shaping and hydrothermal treatment, the silica comprising support material is impregnated with a catalytically active metal, preferably with cobalt. Cobalt impregnation may be performed, for example, with cobalt nitrate.

The catalyst preparation process of the present invention results in a catalyst that has an increased selectivity towards longer hydrocarbons as compared to a catalyst prepared with a silica-comprising support material that has not been subjected to hydrothermal treatment. Surprisingly, such hydrothermal treatment enables a significant improvement in selectivity for $C_5+$ hydrocarbons, simultaneously with decreased methane production.

Whilst not being bound by theory, hydrothermal treatment of the catalyst support may alter the pore diameter of the support in a manner that favours $C_5+$ production.

One method of manufacturing a shaped catalyst support material for use in a method according to the present invention comprises:
a) mixing silica and optionally up to 20 wt % of another refractory oxide with a liquid to form a paste;
b) adding said paste to an extruder, the extruder having a die plate comprising one or more dies, each die having a plurality of apertures; and
c) extruding the paste through said apertures to form catalyst support material extrudates.

While the apertures of the die thus define the cross-sectional shape of the catalyst support particles or the catalyst particles, the modification step in accordance with the invention, involving hydrothermal treatment, alters the pore structure of the catalyst support material and provides the improvements in $C_5+$ selectivity.

To obtain strong extrudates, it is preferred to include in the mixture, prior to extrusion, at least one compound which acts as a peptising agent for the silica. Suitable peptising agents for inclusion in the extrudable mixture are well known in the art and include basic and acidic compounds. Examples of basic compounds are ammonia, ammonia-releasing compounds, ammonium compounds or organic amines. Such basic compounds are removed upon calcination and are not retained in the extrudates to impair the catalytic performance of the final product. Preferred basic compounds are organic amines or ammonium compounds. A most suitable organic amine is ethanol amine. Suitable acidic peptising agents include weak acids, for example formic acid, acetic acid, citric acid, oxalic acid, and propionic acid.

Optionally, burn-out materials may be included in the mixture, prior to extrusion, in order to create macropores in the resulting extrudates. Suitable burnout materials are also commonly known in the art.

After extrusion of the catalyst support material, optionally with the peptising agent and/or burn-out material, the catalyst support is typically subjected to drying and/or to calcination. Generally, the temperature used for drying or calcination is within the range of from 350 to 850° C., preferably in the range of from 450 to 750° C.

The purpose of the drying/calcination treatment is to remove crystal water, to decompose volatile decomposition products and to convert organic and inorganic compounds to their respective oxides. Such treatment has little effect on pore diameter and surface area of the catalyst support.

In accordance with the process of the present invention, hydrothermal treatment of the catalyst support material may be carried out either before extrusion or, more preferably, after extrusion. More preferably the hydrothermal treatment is carried out after extrusion and after drying and calcination of the extrudates.

The hydrothermal treatment may be effected at lower temperatures than typically used for drying or calcination. For example, hydrothermal treatment is preferably carried out at temperatures from about 120 to 250° C., more preferably from about 140 to 220° C., and even more preferably at about 160 to 200° C.

The hydrothermal treatment is preferably carried out in the presence of an acid, in the presence of an alkali, or in the presence of an acid and an alkali, e.g. in the presence of a solution containing both acidic and alkalinic components. Acidic components for use in such hydrothermal treatment include both inorganic acids, such as nitric acid, and organic acids, such as formic acid, acetic acid, citric acid, oxalic acid and propionic acid. Preferred alkaline components for use in the hydrothermal treatment include organic amines or ammonium compounds, or other such weak bases, with monoethanolamine (MEA) being particularly preferred.

The catalyst support material may be subjected to hydrothermal treatment in neutral, acidic or alkaline conditions. The hydrothermal treatment may be performed using water, or using a solution with a pH in the range of between 1 and 11.

The hydrothermal treatment may be performed at a pH in the range of between 1 and 7. In a preferred embodiment the hydrothermal treatment is performed using a liquid or a solution having a pH of about 7, e.g. using steam. More preferably the hydrothermal treatment is carried out in the presence of a solution with a pH in the range of between 7 and 11. Even more preferably the hydrothermal treatment is performed using a monoethanolamine comprising solution with a pH in the range of between 7 and 11, or using a monoethanolamine and nitric acid comprising solution with a pH in the range of between 7 and 11.

Preferably the acidic and alkaline solutions used in the hydrothermal treatment may be those that do not include heteroatoms, such as P, Cl, Br, I, S, K, Na, etc, since it may then be necessary to include a washing step to remove such heteroatoms from the carrier prior to impregnation with the active metal. It will be appreciated that such heteroatoms are not readily removed from the carrier under the lower temperature conditions used in the hydrothermal treatment.

Monoethanolamine is particularly preferred, either alone or in combination with an acid, e.g nitric acid. The acids or alkalis mentioned above may preferably be present in aqueous solution, for example in the range of from 0.01 mol/l to 0.05 mol/l.

Advantageously, the hydrothermal treatment may be carried out for a period of not less than 12 hours, preferably between 16 and 48 hours, most preferably between 20 and 28 hours. The duration of the hydrothermal treatment may vary according to the temperature at which this modification is carried out.

The hydrothermal treatment may be generally carried out in air at atmospheric pressure, or in an autoclave where the steam pressure increases in line with steam tables.

The hydrothermal treatment may advantageously be arranged to modify the median pore diameter of the carrier to fall within any of the ranges described herein.

Following hydrothermal treatment, and forming if the hydrothermal treatment is performed prior to shaping, the formed support material is loaded with the catalytically active metal. The loading may be continued until the amount of active metal present in the loaded catalyst ranges from 1 to 100 parts by weight per 100 parts by weight of carrier material, preferably from 3 to 50 parts by weight per 100 parts by weight of carrier material.

The catalytically active metal is preferably a metal from Group VIII of the Periodic Table of Elements (as defined in the IUPAC version of the Periodic Table described in the 68$^{th}$ Edition of The Handbook of Chemistry and Physics (CPC Press)). Particular catalytically active metals include ruthenium, iron, cobalt and nickel. Cobalt is especially preferred, advantageously by impregnation using cobalt nitrate.

The active metal may be loaded on the hydrothermally treated carrier together with one or more metal promoters or co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst promoter comprises at least one of an element in Group IVB, VB, VIIB and/or VIII of the Periodic Table, preferably titanium, zirconium, manganese and/or vanadium, more preferably manganese or vanadium. As an alternative or in addition to the metal oxide promoter, the catalyst may comprise a metal promoter selected from Groups VIIB and/or VIII of the Periodic Table. Preferred metal promoters include rhenium, ruthenium, platinum and palladium.

The promoter, if present in the catalyst, is typically present in an amount of from 0.001 to 100 parts by weight per 100 parts by weight of carrier material, preferably 0.05 to 20, more preferably 0.1 to 15. It will however be appreciated that the optimum amount of promoter may vary for the respective elements which act as promoter.

If appropriate, drying and/or calcination is carried out after the catalytic metal and/or the promoter is impregnated onto the modified carrier. The drying temperature is normally between ambient temperature to 150° C.

The resulting catalyst may then be activated, for example, by contacting with hydrogen or a hydrogen-containing gas typically at temperatures of about 200 to 450° C.

Any drying and/or calcination step and subsequent activation preferably take place under conditions whereby the already modified pore structure (e.g. median pore diameter) of the carrier undergoes no further modification.

In a preferred embodiment of the process for preparing a Fischer-Tropsch catalyst, the silica in the catalyst support material has a median pore diameter [V] of 20 nm or greater, preferably in the range of from 30 nm to 85 nm, more preferably from 35 nm to 70 nm, prior to impregnation with the catalytically active metal.

In a preferred embodiment of the process for preparing a Fischer-Tropsch catalyst, the surface area of the silica in the catalyst support material is 200 m$^2$/g or less, more preferably is in the range of from 40 to 120 m$^2$/g, and most preferably is in the range of from 60 to 100 m$^2$/g, prior to impregnation with the catalytically active metal.

In a preferred embodiment of the process for preparing a Fischer-Tropsch catalyst, the total pore volume of the silica in the catalyst support material is in the range of from 50 to 200 ml/g, more preferably in the range of from 70 to 150 ml/g, even more preferably in the range of from 80 to 120 ml/g, prior to impregnation with the catalytically active metal.

More preferably the process for preparing a Fischer-Tropsch catalyst is performed using a catalyst support material comprising silica having a median pore diameter [V] of 20 nm or greater, preferably in the range of from 30 nm to 85 nm, more preferably from 35 nm to 70 nm, prior to impregnation with the catalytically active metal, said silica also having a surface area of 200 m$^2$/g or less, more preferably a surface area in the range of from 40 to 120 m$^2$/g, and most preferably a surface area in the range of from 60 to 100 m$^2$/g, prior to impregnation with the catalytically active metal.

Even more preferably the process for preparing a Fischer-Tropsch catalyst is performed using a catalyst support material comprising silica having a median pore diameter [V] of 20 nm or greater, preferably in the range of from 30 nm to 85 nm, more preferably from 35 nm to 70 nm, prior to impregnation with the catalytically active metal, said silica also having a surface area of 200 m$^2$/g or less, more preferably a surface area in the range of from 40 to 120 m$^2$/g, and most preferably a surface area in the range of from 60 to 100 m$^2$/g, prior to impregnation with the catalytically active metal, said silica also having a total pore volume in the range of from 50 to 200 ml/g, more preferably in the range of from 70 to 150 ml/g, even more preferably in the range of from 80 to 120 ml/g, prior to impregnation with the catalytically active metal.

References herein to median pore diameter are to the median pore diameter by volume, i.e. 50% by volume of the pores has a diameter that is smaller than the median pore diameter and 50% by volume of the pores has a diameter that is larger than the median pore diameter. The median pore diameter is measured by mercury intrusion porosimetry according to ASTM D4284.

Pore volume distribution and surface area are also measured according to standard test methods issued under ASTM D 4284, such as ASTM D 4284-03.

The invention also resides in a catalyst prepared according to the process of the invention. Preferably, the catalyst comprises cobalt as active metal.

The invention also resides in the use in a Fischer-Tropsch process of a catalyst as hereinbefore described with reference to the first and further aspects of the invention.

The invention provides a process for performing a Fischer Tropsch reaction comprising the following steps:
- providing a reactor with a catalyst prepared according to the invention;
- providing syngas to the reactor and providing the following process conditions in the reactor: a temperature in the range from 125 to 350° C., a pressure in the range from 5 to 150 bar absolute, and a gaseous hourly space velocity in the range from 500 to 10000 Nl/l/h;
- removing Fischer Tropsch product from the reactor.

Embodiments of the invention will now be described, by way of example only, with reference to the accompanying drawing.

Experiments

Catalyst supports comprising either alumina, silica, or titania were prepared. Data for zirconia comprising supports were taken from literature.

The preparation of alumina comprising supports for examples A, 1, 2 and 3 was performed as follows. An extrusion mix of $Al_2O_3$ (Pural® SB1) powder, citric acid, and Superfloc® flocculant were thoroughly mixed with water and then extruded. The extrudates were dried at 140° C. and then calcined at 680° C.

The preparation of silica comprising supports for examples $B^I$, B, C, 4, 5, 6 and 7 was performed as follows. An extrusion mix of $SiO_2$ (Aerosil® 380) powder, monoethanolamine (MEA), silica sol (Nalco®), Superfloc® flocculant and water were thoroughly mixed and then extruded. For example $B^I$, samples of extrudates were dried and then each sample was calcined at a different temperature. For examples B, C, 4, 5, 6 and 7 the extrudates were dried at 140° C. and then calcined at 700° C.

The preparation of titania comprising supports for examples D, 8 and 9 was performed as follows. A mixture was prepared comprising titania powder, water and several extrusion aids. The mixture was kneaded. The mixture was shaped using extrusion. The extrudates were dried and calcined.

Examples A, B, C and D are examples in which the supports were not subjected to a heat treatment or thermal heat treatment after their preparation.

In Examples 1 to 9, the prepared supports were subjected to a heat treatment or to a hydrothermal treatment. Details of these treatments can be found in the notes below Table 1.

The pore structure of the alumina, silica and titania supports was determined using Hg porosimetry (according to the ASTM D 4284-03 method).

After determination of the total pore volume, the total surface area, and the mean pore diameter, alumina and silica supports were impregnated with cobalt in order to obtain catalyst particles. The supports were loaded with cobalt by incipient wetness impregnation to obtain a loading of about 10 wt % Co (based on the total weight of the catalyst).

For 200 milligram scale tests, cobalt/alumina catalyst particles and cobalt/silica catalyst particles were activated by reduction in 30% $H_2$ at 435° C. for 10 hours after ramping at 0.5° C./min. The activity and selectivity of the resulting catalysts was measured at 215° C., 60 bar, 25% inert, FR 1.1 (where FR is the $H_2$/CO ratio) and 26% CO conversion.

For 7 grams scale tests, cobalt/silica catalyst particles were activated by reduction in hydrogen at 280° C. for 27 hours. The activity and selectivity of the resulting catalyst was measured at 220° C., 60 bar, 25% inert, FR 1.25 and 40% CO conversion.

Table 1 shows an overview of the support treatments for the experiments performed.

TABLE 1

| Ex. | Carrier | Treatment | Comment |
|---|---|---|---|
| A | $Al_2O_3$ | None | |
| 1. | $Al_2O_3$ | Calcination at 1100° C. | |
| 2. | $Al_2O_3$ | Calcination at 1110° C. | |
| 3. | $Al_2O_3$ | HT MEA 140° C. (pH 10) | |
| $B^I$ | $SiO_2$ | None, but different calcination temperatures during preparation | |
| B | $SiO_2$ | None | |
| 4. | $SiO_2$ | HT MEA 180° C. (pH 10) | According to invention |
| 5. | $SiO_2$ | HT (pH 7) | According to invention |
| C | $SiO_2$ | None | |
| 6. | $SiO_2$ | HT MEA 160° C. (pH 10) | According to invention |
| 7. | $SiO_2$ | HT MEA 200° C. (pH 10) | According to invention |
| D | $TiO_2$ | None | |
| 8. | $TiO_2$ | Calcination | |
| 9. | $TiO_2$ | HT | |
| $E^I$ | $ZrO_2$ | None, but different calcination temperatures during preparation | |

Notes on Table 1

1) Examples 1 and 2 involved heat treatment at the shown temperatures, at ambient pressure in a static oven, for 2 hours.
2) Example 3 involved hydrothermal (HT) treatment of an alumina carrier. For the alumina carrier, 0.02 mol/l of MEA/$HNO_3$ in water as solvent was added to the carrier material at a ratio of 300 ml solvent to 100 ml carrier material, loaded into an autoclave and heated at 140° C. for 24 hours at autogenic pressure. The pH of the solution used for the hydrothermal treatment was about 10.
3) Examples 4 and 6 involved hydrothermal (HT) treatment of a silica carrier. For the silica carrier, 0.02 mol/l of MEA in water as solvent was added to the carrier material at a ratio of 300 ml solvent to 100 ml carrier material, loaded into an autoclave and heated at 180° C. for 24 hours at autogenic pressure. The pH of the solution used for the hydrothermal treatment was about 10.
4) Example 5 involved hydrothermal (HT) treatment of a silica carrier using steam. For example 5 the pH of the steam was about 7.

Experimental Results

Titania

Examples D, 8 and 9 showed the following.

Hydrothermal treatment at a temperature in the range of from 120 to 250° C. of the titania extrudates did not have a significant effect on the structure of the support material.

Thermal treatment of titania did have an effect on the structure of the support material. When the titania extrudates were treated by calcination at temperatures above 600° C., the median pore diameter was increased and the total pore volume was reduced. Overall, far from optimal Fischer- Tropsch results were obtained for catalysts prepared from heat treated titania supports as compared to titania supports that were not subjected to heat treatment. This was probably due to a too small total pore volume in the heat treated titania.

Hence, neither thermal treatment nor hydrothermal treatment of titania results in an improved Fischer-Tropsch catalyst.

Zirconia

Example $E^I$ has been taken from literature. "Effect of drying method and precipitation pH in $ZrO_2$ preparation on its structural and textural properties", IP.COM Journal, IP.COM Inc., West Henrietta, N.Y., US, 11 Oct. 2004, shows in FIG. 2 that with increased calcination temperature the median pore diameter was increased and the total pore volume was reduced.

The current inventors found that catalysts prepared by impregnating zirconia supports, which were calcined at about 400° C., with cobalt show a very low selectivity towards $C_5+$ hydrocarbons in a Fischer-Tropsch reaction as compared to similar catalysts with a silica or titania support.

It is to be expected that catalysts prepared from zirconia supports which were calcined at a temperature above 400° C. also do not show optimal results. This is concluded in view of the results found by the present inventors for titania and for zirconia (see above) combined with the information in "Effect of drying method . . . ", IP.COM Journal, IP.COM Inc., West Henrietta, N.Y., US, 11 Oct. 2004, for zirconia.

Both titania and zirconia show an increased median pore diameter and a reduced total pore volume when calcined at a high temperature. The reduced total pore volume will probably have a negative effect on the Fischer-Tropsch results of a zirconia support, similar to the negative effect found for titania. And, a non-heat-treated zirconia catalyst already shows a very low selectivity towards $C_5+$ hydrocarbons in a Fischer-Tropsch reaction as compared to similar catalysts with a silica or titania support.

Thermal treatment of zirconia thus probably does not result in a good Fischer-Tropsch catalyst as compared to a Fischer-Tropsch catalyst with a silica or a titania support.

Alumina

Examples A, 1, 2 and 3 showed the following.

TABLE 2

| Ex. | Carrier | Treatment | Pore Volume (ml/g) | Surface Area (m²/g) | Median Pore Diameter [V] (nm) | WTY g/ product/ kg catalyst/ hour | $C_5+$ |
|---|---|---|---|---|---|---|---|
| A | $Al_2O_3$ | None | 0.48 | 204 | 9.8 | 91 | 80.7 |
| 1. | $Al_2O_3$ | Calc 1100° C. | 0.30 | 65 | 17.6 | 85 | 84.9 |
| 2. | $Al_2O_3$ | Calc 1110° C. | 0.26 | 36 | 47.6 | 101 | 86.3 |
| 3. | $Al_2O_3$ | HT MEA 140° C. | 0.51 | 151 | 14.3 | | |

Notes on Table 2

1) Pore volume, surface area and median pore diameter measurements were performed before loading with cobalt.

2) The Fischer-Tropsch tests for examples A and 1 to 3 were performed at 200 milligram scale.

The heat treatment at 1100° C. and the heat treatment at 1110° C. resulted in a highly increased median pore diameter. The total pore volume was decreased from 0.48 ml/g to 0.30 and 0.26 ml/g respectively.

For catalysts prepared from heat treated alumina supports, significant improvements in $C_5+$ selectivity were observed; see Table 2. The $C_5+$ selectivity was increased from 80.7 to 84.9 and 86.3 respectively.

The hydrothermal heat treatment at about pH 10 and 140° C. did not result in a significant change of the median pore diameter and the total pore volume remained about the same.

Hence, hydrothermal treatment of alumina hardly has an effect on the pore structure. Heat treatment, on the other hand, is a suitable method to prepare improved alumina-comprising Fischer-Tropsch catalysts.

As will be discussed below, it was now surprisingly found that hydrothermal treatment of silica results in even better Fischer-Tropsch catalysts.

Silica

Examples $B^I$, B, C, 4, 5, 6 and 7 showed the following.

Calcination at temperatures above 500° C. and above 700° C. of silica extrudates did not have a significant effect on the structure of the support material.

Hydrothermal treatment of silica support extrudates showed significant changes in the median pore diameter, while the total pore volume remained about the same.

Hydrothermal treatment at about pH 7, e.g. performed with steam, resulted in an increased median pore diameter while the total pore volume remained about the same. Also hydrothermal treatment at pH 10 at 160, 180 and 200° C. resulted in an increased median pore diameter while the total pore volume remained about the same.

For catalysts prepared from hydrothermal treated silica supports, significant improvements in $C_5+$ selectivity were observed; see Table 3. For the 200 milligram scale tests the $C_5+$ selectivity was increased from 87.2 to 91.5. For the 7 grams scale tests the $C_5+$ selectivity was increased from 89.7 to 91.5 and 92.1 respectively.

TABLE 3

| Ex. | Carrier | Treatment | Pore Volume (ml/g) | Surface Area (m²/g) | Median Pore Diameter [V] (nm) | WTY g/ product/ kg catalyst/ hour | $C_5+$ |
|---|---|---|---|---|---|---|---|
| B | $SiO_2$ | None | 0.84 | 224 | 15.8 | 78 | 87.2 |
| 4. | $SiO_2$ | HT MEA 180° C. | 0.85 | 81 | 45.9 | 136 | 91.5 |
| C | $SiO_2$ | None | 0.98 | 230 | 16.9 | 293 | 89.7 |
| 6. | $SiO_2$ | HT MEA 160° C. | 1.01 | 108 | 37.0 | 219 | 91.5 |
| 7. | $SiO_2$ | HT MEA 200° C. | 1.02 | 71 | 56.9 | 269 | 92.1 |

Notes on Table 3

1) Pore volume, surface area and median pore diameter measurements were performed before loading with cobalt.

2) The Fischer-Tropsch tests for examples B and 4 were performed at 200 milligram scale. The Fischer-Tropsch tests for examples C, 6 and 7 were performed at 7 grams scale.

Hence, thermal treatment of silica hardly has an effect on the pore structure. Hydrothermal treatment, on the other hand, is a highly suitable method to prepare improved silica-comprising Fischer-Tropsch catalysts.

Hydrothermal treatment of silica can be used to prepare even better Fischer-Tropsch catalysts than with thermal treatment of alumina. Preferably the silica in the catalyst support material has a median pore diameter [V] of 20 nm or greater, preferably in the range of from 30 nm to 85 nm, more preferably from 35 nm to 70 nm, prior to impregnation with a catalytically active metal, which most preferably is cobalt.

Concluding, it was found that by subjecting a silica-comprising catalyst support material to a hydrothermal treatment, the pore structure of the support material may be changed. The pore structure may be altered such that the surface area of the formed support material is reduced, and the median pore diameter is increased, while the total pore volume of the support remains about the same. Hydrothermal treatment of silica is a highly suitable method to prepare improved Fischer-Tropsch catalysts.

While preferred embodiments have been shown and described, it is to be understood that the invention is not limited thereby, and modifications and variations may be made without departing from the scope of the invention as defined by the claims.

The invention claimed is:

1. A process for performing a Fischer Tropsch reaction comprising the following steps:
    providing a reactor with a cobalt based Fischer-Tropsch catalyst
        comprising a catalyst support material consisting of 80 to 100% by weight silica and up to 20% by weight of another refractory oxide; wherein the
        the catalyst support material has previously been subjected to a hydrothermal treatment wherein the hydrothermal treatment is performed using a monoethanolamine comprising solution with a pH in the range of between 7 and 11, or using a monoethanolamine and nitric acid comprising solution with a pH in the range of between 7 and 11; and wherein the catalyst support material is shaped before or after the hydrothermal treatment;
    providing syngas to the reactor and providing the following process conditions in the reactor: a temperature in the range from 125 to 350° C., a pressure in the range from 5 to 150 bar absolute, and a gaseous hourly space velocity in the range from 500 to 10000 Nl/l/h;
    removing Fischer Tropsch product from the reactor.

2. The process for performing a Fischer Tropsch reaction according to claim 1 wherein the process for manufacturing the Fischer-Tropsch catalyst further comprises the step of:
    impregnating the shaped treated catalyst support material with a catalytically active metal.

3. The process for performing a Fischer Tropsch reaction according to claim 2 wherein the process for manufacturing the Fischer-Tropsch catalyst further comprises the step of:
    subjecting the obtained catalyst to hydrogen or a hydrogen-containing gas.

4. The process for performing a Fischer Tropsch reaction according to claim 2, wherein the silica in the catalyst support material has a surface area of 200 $m^2$/g or less prior to impregnation with the catalytically active metal.

5. The process for performing a Fischer Tropsch reaction according to claim 2, wherein the silica in the catalyst support material has a total pore volume in the range of from 50 to 200 ml/g prior to impregnation with the catalytically active metal.

6. The process for performing a Fischer Tropsch reaction according to claim 1, wherein in process for manufacturing the Fischer-Tropsch catalyst the catalyst support material is subjected to hydrothermal treatment in the presence of an acid, in the presence of an alkali, or in the presence of an acid and an alkali.

7. The process for performing a Fischer Tropsch reaction according to claim 1, wherein in process for manufacturing the Fischer-Tropsch catalyst the hydrothermal treatment of the catalyst support material is carried out at a temperature in the range of from 120 to 250° C.

8. The process for performing a Fischer Tropsch reaction according to claim 1, wherein the silica in the catalyst support material has a median pore diameter [V] of 20 nm or greater prior to impregnation with the catalytically active metal.

* * * * *